3,682,768
THERMOFORMABLE LAMINATED SHEET MATERIAL HAVING ELASTOMERIC BLOCK COPOLYMER CORE AND ABS PLASTIC COVERING LAYERS
Gerald E. Adams, Mishawaka, and Edward C. Van Buskirk, South Bend, Ind., assignors to Uniroyal, Inc., New York, N.Y.
No Drawing. Filed Mar. 9, 1970, Ser. No. 17,922
Int. Cl. B32b 27/08; C08f 15/00
U.S. Cl. 161—253
5 Claims

ABSTRACT OF THE DISCLOSURE

A thermoformable laminated sheet material, characterized by high impact strength at low temperature, has a core layer made of an elastomeric block copolymer of styrene and butadiene, and outer covering layers of ABS plastic.

BACKGROUND OF THE INVENTION (1) Field of the invention

This invention relates to a thermoformable laminated sheet material.

(2) Description of the prior art

Thermoformable ABS sheet materials are disclosed for example in U.S. Pats. 3,281,201, R. C. Bolesky, Oct. 25, 1966 and 3,356,560, G. H. Callum, Dec. 5, 1967.

Elastomeric block copolymers are disclosed in U.S. Pat. 3,265,765, G. Holden et al., Aug. 9, 1966.

Laminates prepared from polyalkenes and certain hydrogenated block copolymers are disclosed in U.S. Pat. 3,242,038, C. A. Dallas et al., Mar. 22, 1966.

SUMMARY OF THE INVENTION

In certain applications, employment of ABS material has heretofore been impractical because of poor low temperature impact resistance. This problem has long troubled the plastic sheet user. In accordance with the present invention, it has been found that a layer of elastomeric block copolymer (of the general configuration A–B–A as defined herein), employed as a central core between two outer sheets of ABS material, results in a laminated structure displaying unusually high impact strength, by the Izod test procedure, even at low temperature.

DETAILED DESCRIPTION OF THE INVENTION

The expression "ABS plastic" is used herein in its conventional sense as denoting the gum plastic derived from the monomers acrylonitrile, butadiene and styrene. As is well known to those skilled in the art, the ABS plastic may be of the graft copolymer type, or of the physical blend type (polyblend), or a combination of the two. The conventional ABS graft copolymers are made by graft copolymerizing resin-forming monomers, namely, styrene and acrylonitrile, on a previously prepared polybutadiene rubber spine, or a butadiene-styrene copolymer rubber spine; in the final graft copolymer the resinous portion and the rubbery portion are believed to be in large part chemically combined. The physical blend type of ABS is typically a mixture of butadiene-acrylonitrile rubber with separately prepared styrene-acrylonitrile resin. In some cases, the graft polymer type of ABS is blended with additional separately prepared styrene-acrylonitrile resin. If desired, other monomers such as alpha-methylstyrene may be substituted for some or all of the styrene, particularly in the styrene-acrylonitrile resin portion of the ABS. Usually the proportion of rubbery component in the ABS is from 5 to 35% while the proportion of resin is correspondingly from 95 to 65%. The over-all proportion of acrylonitrile, butadiene and styrene usually falls within the ranges: 10 to 40% acrylonitrile; 5 to 65% butadiene; and 25 to 85% styrene. As indicated, the ABS material forms the outer layers or faces of the laminated sheet material of the invention.

The elastomeric block copolymer used as the core layer, sandwiched in between two outer layers of ABS in the laminate of the invention, has the general configuration A–B–A and is described in more detail in a paper by Holden et al., "Thermoplastic Elastomers," Journal of Polymer Science Part C, No. 26, pp. 37–57, 1969, as well as in the U.S. Pat. 3,265,765, referred to above, the disclosures of which are hereby incorporated herein by reference. In the block copolymer of A–B–A configuration each A is an independently selected non-elastomeric monovinyl aromatic hydrocarbon (arene, preferably styrene) polymer block having an average molecular weight of 2,000–100,000 (preferably 5,000–50,000) and a glass transition temperature above about 25° C. (preferably above about 50° C.) The total block A content being 10–50% (preferably 15–40%) by weight of the copolymer and B is an elastomer conjugated diene (preferably butadiene) polymer block having an average molecular weight between about 25,000 and 1,000,000 (preferably 50,000–500,000) and a glass transition temperature below about 10° C. (preferably below about −25° C.), said copolymer having a tensile strength at 23° C. in excess of about 1400 pounds per square inch. An example is a block copolymer containing 40% styrene and 60% butadiene linked in the configuration S–B–S in a ratio of about 1:3:1, in the molecular weight range of 30–90,000 as represented by such commercially available materials as Shell Kraton 1101, or Shell Thermolastic 101, having a polystyrene domain glass transition temperature of 100° C. determined by a Wallace dynamic strain tester at 8.5 cycles per second and 1% deformation, and an ultimate tensile strength of 3600 p.s.i. at 50° C. and 1900 p.s.i. at 60° C., measured at 10 inches per minute crosshead speed on films cast from 25% toluene solutions. The block copolymer may be used as such or it may be compounded with appropriate modifying materials, for example 25 parts (per 100 parts by weight of block copolymer) of No. 3 naphthenic oil as a plasticizer, as represented by such commercially available materials as Shell Kraton 3125 or ST–125.

The laminate of the invention may be prepared in accordance with any suitable conventional procedures for laminating thermoplastic sheets. The elastomeric block copolymer of styrene and butadiene used as the core of the laminate may be formed into sheets by means of an extruder, a mold, a calender, or other plastic processing equipment well known in the art of shaping thermoplastic resins, using temperatures for example in the range of 320°–360° F., depending upon the method and speed of operation. The ABS resin may be shaped into sheets in like manner using temperatures in the range of 320°–400° F. To make the laminate, a core sheet of the block copolymer may be placed on top of a sheet of ABS in face-to-face contact, and another sheet of ABS may be placed on top of the core sheet, and the assembly then heated while pressing the sheets together, for example at a temperature of about 320° F. for about ½ hour, to unite the thermoplastic sheets, at their contacting faces, into a unitary laminate.

The laminate may be of any suitable desired thickness, for example up to ½ inch or more. The core layer of block copolymer may be for example from 5 to 200 mils thick or other suitable desired thickness; the outer ABS layers are frequently somewhat thicker than the core layer and may be for example from 10 to 500 mils thick or other suitable desired thickness.

It will be understood that the desired thickness in any given layer may be achieved if desired by plying together more than one sheet of the material constituting that layer, all the sheets becoming integrally bonded together into a unitary laminate upon application of heat while applying pressure (e.g., in a press or with the aid of a vacuum blanket). If desired the outer faces of the laminate may be provided with suitable further protective or decorative layers or coatings (e.g., as disclosed in the Callum Patent 3,356,560 referred to above), or may be plated with metal.

The unexpectedly high impact strength of the laminate of the invention at low temperatures renders the laminate highly useful in many applications in which ABS sheet material could not heretofore be used because of insufficient impact strength at low temperatures. Such applications include crash helmets, automobile bumpers and other automotive and aircraft parts, shipping containers, and sporting goods. The achievement of this result (high impact strength at low temperature) by using a core of elastomeric styrene-butadiene block copolymer of the kind described is particularly remarkable in view of the fact that a number of other elastomers were not as effective for this purpose when used as the center ply of the laminate.

The introduction of the elastomeric block copolymer of styrene and butadiene as a center ply between ABS plastic outer layers significantly improves the energy absorption of the laminate. The improvement increases as the thickness of the laminate increases. In a drop impact test, the temperature at break is greatly improved (lowered) for the heavier constructions by the addition of the elastomeric block copolymer layer.

A balanced construction (i.e., one in which the outer ABS plies are of equal thickness) has, in general, larger energy absorption than unbalanced construction. The thickness of the outer ply opposite the hit side is in many cases more significant than the thickness of the hit side or of the center ply.

The beneficial effect of the elastomeric block copolymer core in the laminate is evident not only in drop impact testing of flat samples, but also in formed laminates such as cups made by thermoforming flat sheets.

Whereas ABS itself when formed with 50% draw lost impact properties, the formed laminates of the invention in contrast retained cold impact properties.

A comparison between a laminate of the invention and an ABS control, in a modified Izod impact test, gave the following results:

|  | Temperature, °F. | Impact strength, foot-pounds |
|---|---|---|
| ABS control | 74 | 16 |
| Do | −60 | 11 |
| Laminate of invention | 74 | 10.7 |
| Do | −60 | 14.8 |

It was surprising to find that the laminate of the invention had higher impact strength than the ABS control at low temperature in spite of the fact that the ABS control had higher impact strength at ordinary room temperature.

The bond strength of the ABS layers to the elastomeric block copolymer core is good, typically being about five pounds per square inch in the strip adhesion test at 160° F. and increasing as the temperature decreases.

Since the laminate is thermoplastic, scrap material may be reprocessed.

The following example will serve to illustrate the practice of the invention in more detail.

EXAMPLE

An ABS is provided containing 22.2% acrylonitrile, 26.5% butadiene and 51.3% styrene, made by blending 53 parts of a graft copolymer composition (34 parts of styrene and 16 parts of acrylonitrile graft copolymerized on 50 parts of polybutadiene) with 47 parts of separately prepared styrene-acrylonitrile resin containing 71% styrene and 29% acrylonitrile. This hard, resinous, rigid gum plastic is calendered (at 380° F.) into sheets 45 mils thick.

A commercial elastomeric block copolymer of styrene and butadiene of the configuration A–B–A known as Shell Kraton 3125 is provided (prepared for example as described in the Holden et al. Patent 3,265,765 referred to above), containing 25 parts of No. 3 naphthenic oil (per 100 parts by weight of block copolymer) as a plasticizer. This flexible, thermoplastic material is calendered (at 340° F.) into a sheet 20 mils thick.

The sheet of elastomeric block copolymer is sandwiched in between two sheets of the ABS and the assembly is subjected to pressure of 12–14 p.s.i. under a vacuum blanket without shims at a temperature of 320° F. for 30 minutes to unite the sheets at their contacting faces, forming an integral laminate. This laminate shows no impact failure when tested at −65° F. by the Izod test, whereas the ABS itself fails at 0° F. The low temperature impact resistance of the laminate remains substantially unchanged after thermoforming.

Having thus described our invention, what we claim and desire to protect by Letters Patent is:

1. A laminated sheet material having the following layers laminated together:
  (a) a core layer made of a thermoplastic elastomeric block copolymer consisting of a material having the general configuration A–B–A wherein
    (1) A is a styrene polymer block having an average molecular weight of 5,000–50,000 and a glass transition temperature above about 50° C., the total block A content being 15–40% by weight of the copolymer; and
    (2) B is a butadiene polymer block having an average molecular weight of 50,000–500,000 and a glass transition temperature below about −25° C.;
    (3) said copolymer having a tensile strength at 23° C. in excess of about 1400 pounds per square inch, and
  (b) an outer layer overlying each surface of the said core layer integrally united thereto in face-to-face contact made of acrylonitrile-butadiene-styrene copolymeric plastic material consisting of 10 to 40% by weight acrylonitrile, 5 to 65% by weight butadiene and 25 to 85% by weight of styrene, said acrylonitrile-butadiene-styrene plastic material being selected from the group consisting of (i) a graft copolymer of styrene and acrylonitrile on polybutadiene rubber or butadiene-styrene copolymer rubber, and (ii) a mixture of said graft copolymer with separately prepared styrene-acrylonitrile resin, the proportion of the said rubber in the said acrylonitrile-butadiene-styrene plastic material being from 5 to 35%, based on the weight of the acrylonitrile-butadiene-styrene plastic material, the said laminated sheet material being characterized by high impact resistance at low temperature and being thermoformable without loss of low temperature impact resistance.

2. A laminate as in claim 1 in which the acrylonitrile-butadiene-styrene copolymeric plastic material is a graft copolymer of styrene and acrylonitrile on polybutadiene or butadiene-styrene copolymer.

3. A laminate as in claim 1 in which the elastomeric block copolymer contains 40% styrene and 60% butadiene.

4. A laminate as in claim 1 in which the acrylonitrile-butadiene-styrene copolymeric plastic material is (ii) a mixture of said graft copolymer with separately prepared styrene-acrylonitrile resin.

5. A thermoformed laminate as in claim 4.

References Cited
UNITED STATES PATENTS

| | | | |
|---|---|---|---|
| 3,438,845 | 4/1969 | Cohen et al. | 161—254 X |
| 3,242,038 | 3/1966 | Dallas et al. | 260—876 B |

FOREIGN PATENTS

| | | | |
|---|---|---|---|
| 544,296 | 7/1957 | Canada | 161—254 |

OTHER REFERENCES

"Modern Plastics Encyclopedia," 1967, being the September 1966 issue of "Modern Plastics," vol. 44, No. 1A, frontispiece, and pp. 104–109, McGraw-Hill, New York.

ROBERT F. BURNETT, Primary Examiner

C. B. COSBY, Assistant Examiner

U.S. Cl. X.R.

161—254, 256; 260—29.6 T, 29.7 T, 876 B